(12) United States Patent
Kellett

(10) Patent No.: US 7,485,235 B2
(45) Date of Patent: Feb. 3, 2009

(54) WASTE COLLECTION SYSTEM

(75) Inventor: John Michael Kellett, Pasadena, MD (US)

(73) Assignee: Clearwater Mills LLC, Pasadena, MD (US)

( * ) Notice: Subject to any disclaimer, the term of this patent is extended or adjusted under 35 U.S.C. 154(b) by 42 days.

(21) Appl. No.: 11/652,603

(22) Filed: Jan. 12, 2007

(65) Prior Publication Data

US 2007/0158253 A1    Jul. 12, 2007

Related U.S. Application Data

(60) Provisional application No. 60/758,504, filed on Jan. 12, 2006.

(51) Int. Cl.
*C02F 1/40* (2006.01)
(52) U.S. Cl. .................. 210/747; 210/776; 210/156; 210/170.1; 210/242.1
(58) Field of Classification Search ............... 210/747, 210/776, 156, 170.09, 170.1, 170.11, 242.1, 210/242.3, 923
See application file for complete search history.

(56) References Cited

U.S. PATENT DOCUMENTS

| | | | | |
|---|---|---|---|---|
| 992,563 | A * | 5/1911 | Howard | 210/156 |
| 1,076,483 | A * | 10/1913 | Collar | 210/156 |
| 1,331,935 | A * | 2/1920 | Lee | 210/156 |
| 3,061,103 | A * | 10/1962 | Mitchell | 210/156 |
| 3,268,081 | A | 8/1966 | Menkee et al. | |
| 3,539,048 | A | 11/1970 | Pearson | |
| 3,700,108 | A | 10/1972 | Richards | |
| 3,704,784 | A | 12/1972 | Craggs et al. | |
| 3,730,119 | A | 5/1973 | Budris et al. | |
| 3,966,613 | A | 6/1976 | Kirk et al. | |
| 3,968,041 | A | 7/1976 | DeVoss | |
| 4,253,952 | A * | 3/1981 | Grebb | 210/170.1 |
| 4,322,294 | A | 3/1982 | Price | |
| 4,363,735 | A | 12/1982 | Hook | |
| 4,842,735 | A * | 6/1989 | Hollis et al. | 210/242.3 |
| 4,963,272 | A * | 10/1990 | Garrett | 210/776 |
| 5,028,325 | A | 7/1991 | Hamilton | |
| 5,173,182 | A | 12/1992 | Debellian | |
| 5,207,901 | A | 5/1993 | Ravagnan | |
| 5,362,391 | A | 11/1994 | Stephens | |
| 5,456,197 | A | 10/1995 | Kwok | |
| 5,753,108 | A | 5/1998 | Haynes et al. | |

(Continued)

FOREIGN PATENT DOCUMENTS

JP        02092797 A      4/1990

OTHER PUBLICATIONS http://www.trashskimmer.com/brochure.htm.

*Primary Examiner*—Christopher Upton
(74) *Attorney, Agent, or Firm*—Blank Rome LLP

(57) ABSTRACT

A transportable waste collection system for collecting waste found in a body of flowing water, including non-navigable waters, the system having a flotation platform adapted to floating in the body of water; a waste collection conveyor mounted on the platform having collection and discharge ends; a device for separating the waste from the body of flowing water and conveying the waste along the conveyor to the discharge end; a storage receptacle for storing the conveyed waste; and a water wheel interconnected with and providing power to the waste separation device.

21 Claims, 4 Drawing Sheets

U.S. PATENT DOCUMENTS

| | | | |
|---|---|---|---|
| 6,117,336 A * | 9/2000 | Sachse | 210/170.1 |
| 6,328,165 B1 | 12/2001 | Baker et al. | |
| 6,669,841 B2 | 12/2003 | Morin | |
| 7,045,058 B2 | 5/2006 | Walczyk | |
| 2001/0020434 A1 | 9/2001 | Thomas | |
| 2005/0035070 A1 * | 2/2005 | Egli | 210/776 |

* cited by examiner

WASTE COLLECTION SYSTEM

CROSS REFERENCE TO RELATED APPLICATIONS

This application is related to, and claims priority from, U.S. Provisional Patent Application No. 60/758,504, entitled "Water Wheel Powered Trash Interceptor," filed on Jan. 12, 2006, which is expressly incorporated by reference herein.

BACKGROUND OF THE INVENTION

1. Field of Invention

The present invention is generally related to waste collection devices, system, and methods. In particular, the present invention is related to a primary waste collection unit operation that mechanically filters or screens natural surface water systems, including rivers, lakes, and oceans, to collect, for further handling and treatment, solid waste materials contained in those water systems using the movement of the water as an energy source.

2. Description of the Related Art

It is not uncommon to find solid waste accumulating in streams, rivers, lakes, harbors, bays, beaches and oceans due to anthropogenic activities. That solid waste is not only unsightly and potentially odiferous, but it potentially causes adverse environmental and human health impacts if it is not removed from the environment and disposed of in a proper manner.

One technique for remediating solid waste in relatively calm and navigable surface waters, such as harbors, lakes, and rivers, was developed in the 1980's by New York City's Department of Sanitation (DSNY), and involves a floating, self-contained, self-propelled, conveyorized trash skimmer, commercially available today under the name TRASH-CAT™, which is available from United Marine Technologies. Also called a "skimmer boat," a TRASHCAT™ is a catamaran-like, twin-hull vessel on which are mounted hydraulically powered and controlled open mesh conveyor systems to collect solid waste from surface waters. One end of the inclined continuous conveyor is adapted to being lowered into the water and, when operated, skims floating debris off the surface of the water to depths of up to 2½ feet below the surface. The vessel is optionally equipped with conveyorized skimming "wings" mounted on each side of the main conveyor that extend outward away from the vessel at angles to form a funnel that allows the vessel to maneuver and skim a 16-foot wide area. A diesel engine is used to power a hydraulic pump and other mechanical devices on the vessel, as well as to operate one or more propulsion propellers. According to the literature associated with the TRASHCAT™ skimmer vessel, solid waste transported up the main pickup conveyor is dumped into a storage area on the vessel, which, with its sidewalls, is adapted to hold up to 12,000 pounds or 700 cubic feet of solid waste skimmed from the water on which the vessel operates.

Solid waste collection "skimmer boats," like the TRASH-CAT™, and related components are described in several patent references, including U.S. Pat. No. 3,268,081 (describing a floating skimmer boat without a conveyor); U.S. Pat. No. 3,539,048 (describing a basic skimmer boat conveyor system for collecting flotsam from water surfaces); U.S. Pat. No. 3,968,041 (describing a skimmer vessel that can be fixed in place relative to a moving plume of oil for skimming the oil); U.S. Pat. No. 4,322,294 (describing a skimmer boat with a height-adjustable conveyor component); U.S. Pat. No. 5,028,325 (describing a skimmer vessel with a conveyor with one-eight-inch spaced plastic-coated wires adapted to collecting cigarette butts, among other debris common in waterways); and U.S. Pat. No. 7,045,058 (describing a vessel whereby the conveyor operates in both directions for skimming and then discharging the collected solid waste).

Similar screening techniques, but used primarily for removing solid waste from municipal networked piped systems, such as those associated with municipal wastewater treatment facilities, have also been known for many years. One such technique uses a rotary conveyor or drum screen placed in the path of the wastewater to intercept course solids in the wastewater as described and depicted in Metcalf & Eddy, Inc., *Wastewater Engineering: Treatment, Disposal and Reuse,* 3d ed., McGraw-Hill (1991) at 452. A rotary conveyor or drum screen consists of an influent pipe that conveys wastewater, a rotary conveyor or drum screen partially submerged in the influent water, and a series of effluent pipes that convey the screened wastewater to downstream unit operations for further treatment. The key to the rotary screening unit operation is a rotary conveyor or drum that is fitted with a skin of slotted or perforated openings that allows water to pass through but which collects course solids entrained in the wastewater. As the conveyor or drum rotates, it lifts waste material out of the water and, as it rotates about a central shaft, causes the waste material or "screenings" to fall off of the screens and into collection devices. The rotary conveyor or drum is typically powered by an electrical motor attached to a pulley that loops around a gear on the rotary conveyor drum shaft, or it may be hydraulically operated.

Hence, heretofore, techniques for screening solid waste that have accumulated in surface waters have generally required using a motorized boat that is adapted to maneuvering through the contaminated water to retrieve the solid waste, whereas techniques for screening solid waste that are present in piped wastewater systems have involved in-line, electrically- or hydraulically-powered rotary conveyor or drum systems (among other mechanical techniques not described). Neither system, however, is adapted to operate in relatively turbulent and potentially non-navigable surface waters such as swift rivers that traverse large, populated watersheds, such as the Chesapeake Bay watershed located in the Mid-Atlantic region. Hence, the need for such a system exists.

One advantage of using screening techniques in upstream locations away from harbors and bays, where much of the solid waste eventually accumulates, is that the amount of solid waste making it to those locations is reduced. However, a disadvantage of operating screening devices at such remote locations is that power required to operate the equipment may not be available, or it may be intermittent. One solution to that problem is to use a paddle wheel as generally described in U.S. Pat. No. 5,136,174 (describing a series of paddle wheels placed in the direction of flowing water to generate electricity). Other electrical generating methods, including wind and solar power generators, have been described in other patent references.

SUMMARY AND OBJECTS OF THE INVENTION

In general terms, the present invention relates to a stationary, solid waste screening or skimming vessel for collecting waste from flowing waterways by means of using an inclined plane ladder conveyor powered by an undershot water wheel. Such a device could be used, for example, in the Jones Falls River that drains highly developed and congested areas north of Baltimore City and, after coursing through the city, discharges into Baltimore's Inner Harbor. It is estimated that ninety-percent of the antropogenic solid waste in the lower Jones Falls consists of Styrofoam™, plastic bottles, and other polymeric-based materials, much of which ends up in the Inner Harbor if not intercepted by a device such as the present invention.

The conveyor and water wheel of the vessel are mounted on a floating platform which is moored in place by fixed pilings, cables, chains, or other devices. The water wheel generates power from the flowing current or from an auxiliary back-up pump. The power is transferred to the conveyor by means of, for example, a shaft, gears, sprockets, belts, pulleys and/or chain. The lower end of the conveyor is preferably adapted to being submerged in the water on the upstream end of the floating platform where floating debris is collected by means of floating trash booms. These booms are positioned at an angle to the current in a manner such that the trash and debris are guided to the conveyor by the current.

The floatable solid waste collected by the present invention is lifted by the conveyor and deposited in a collection container. This collection container can be moved and emptied, or placed on a separate movable floating platform, which can then be used to move the collection container to dumping equipment or to a dumping facility. It is estimated that in a location such as the Jones Falls River, the collection container would fill up and need to be emptied 150-200 times each year, depending upon the size of the container and the amount of and frequency of rainfall.

The construction of the vessel is primarily of wood and corrosion-resistant metal hardware. The water wheel is constructed in a dimension that is determined by the velocity of the water in the specific waterway and the conveyor load.

The auxiliary pump is preferably powered by an internal combustion engine and/or by an electric motor. It is plumbed so that the suction is on the downstream side of the wheel with the intake toward the wheel. The discharge is on the upstream side of the wheel directed in such a manner that it powers the wheel at times when the current is insufficient. This auxiliary pump is also fitted with an electrical outlet that can be used to power equipment to clean the platform and other surfaces of the device. The plumbing is made of corrosion resistant material.

As noted above, the device of the present invention will preferably be used to collect floating or partially submerged trash and debris from waterways (e.g., streams, harbors, rivers, lakes, and the like). It is adapted to being moved to different locations or installed permanently as need dictates.

Accordingly, it is a principal object of the present invention to provide a solid waste collection system for collecting solid waste in a body of flowing water.

It is another object of the present invention to provide a solid waste collection system that is simple to operate, requires minimal maintenance, and that can operate in remote locations and in navigable or non-navigable waters.

It is still another object of the present invention to provide a solid waste collection system that generates its own power at least partially from the energy of the flowing water in which it operates or from solar energy.

Briefly described, those and other objects and features of the present invention may be accomplished, as embodied and fully described herein, by a solid waste collection system for collecting solid waste in a body of flowing water that has a flotation platform adapted to being securely positioned in and floating on the flowing water; a solid waste collection conveyor mounted on the platform having, on one end, a collection end inclined downward below the surface of the flowing water, and at the other end, a discharge; a screen positioned at the collection end of the conveyor for screening the waste from the flowing water; a ladder conveyor for separating the solid waste from the flowing water and for conveying the solid waste along the conveyor to the discharge end; a storage container proximate to the discharge end for storing the conveyed solid waste; and a water wheel interconnected with and providing power to the ladder conveyor. At least one boom attached to and extending outward from the upstream end of the platform may be used to convey the solid waste in the flowing water toward the conveyor, as previously described.

In a preferred embodiment, the water wheel is adapted to rotate when it is at least partially submerged in and substantially aligned with the direction of the current of the flowing water. It is interconnected with the ladder members on the ladder conveyor via a rotating belt chain or other power transmitting device. When the volumetric flowrate of the flowing water drops, a water pump automatically begins pumping water toward the water wheel to maintain a minimum rotational velocity.

The objects and features of the invention are also accomplished, as embodied and fully described herein, by a method for collecting solid waste in a body of flowing water by identifying a body of flowing water containing solid waste; securely installing the aforementioned flotation platform in the flowing water; optionally installing at least one boom attached to and extending outward from the upstream end of the platform for conveying at least some of the solid waste; screening the solid waste from the flowing water; and collecting the solid waste in a receptacle. The method also includes the step of pumping water toward the water wheel when the rotational velocity of the water wheel is reduced.

With those and other objects, features, and advantages of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
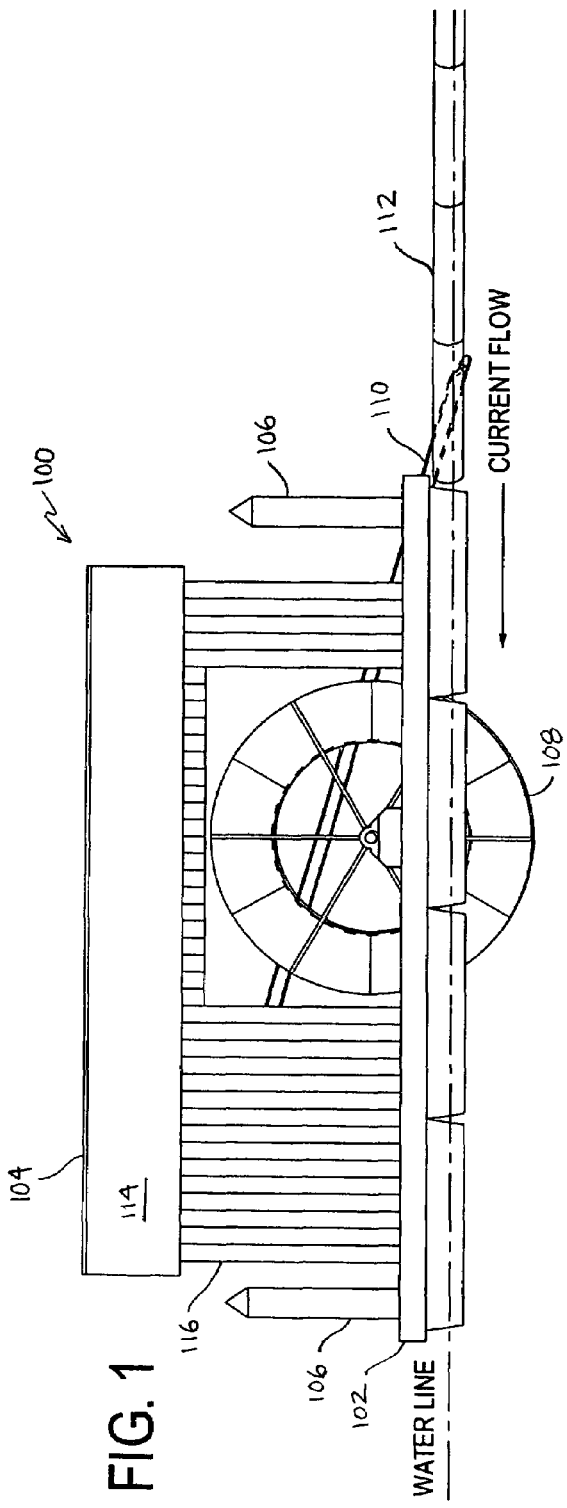
FIG. 1 is a schematic elevation view drawing of a solid waste collection system according to the present invention.

Although preferred embodiments of the invention are described for illustrative purposes, it should be understood that the invention may be embodied in other forms not specifically shown in the drawings.

Turning first to FIG. 1, shown therein is a solid waste collection system 100 according to the present invention. The term "solid waste" is used broadly to refer to non-liquid, substantially non-soluble materials ranging from municipal garbage to industrial wastes that often contain complex and sometimes hazardous substances. "Solid wastes" also include, among other things, sewage sludge, agricultural refuse, demolition wastes, and mining residues. The term "solid waste" also refers to liquids and gases in containers. The term "solid materials" is used broadly to refer to non-liquid, substantially non-soluble materials and includes solid waste. Solid materials, for purposes of this application, would include branches, plant materials, and other organic matter found in waterways. While the focus of the detailed description of the present invention is the collection of solid waste, the invention is obviously equally suitable for collecting more than just solid waste found in flowing waterways.

Figure 4:
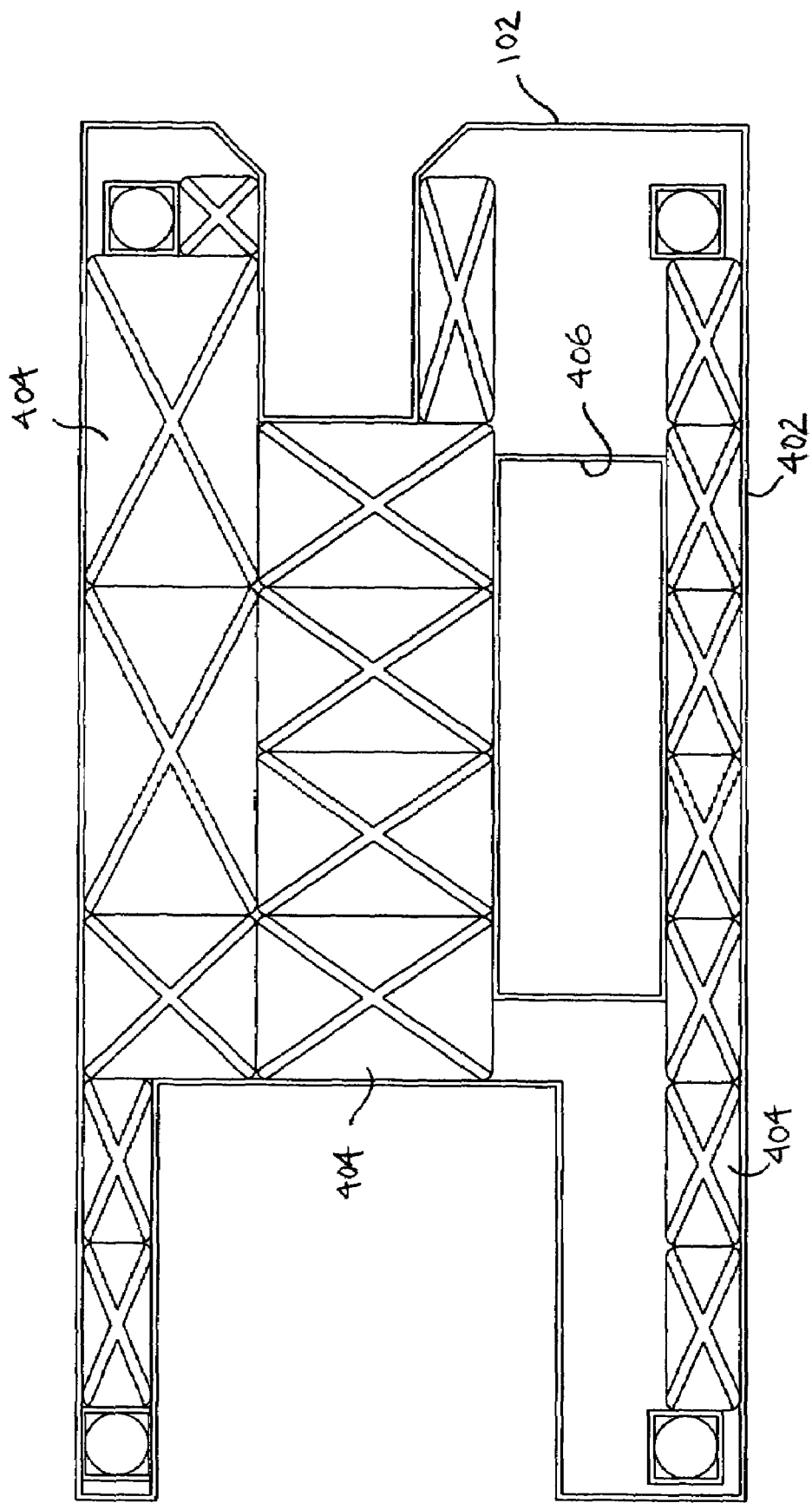
FIG. 4 is a drawing of a bottom view of the flotation platform for the solid waste collection system of FIG. 1.

The solid waste collection system 100 includes a flotation platform 102, covering structure 104, pilings 106, water wheel 108, conveyor 110, and floating booms 112. The flotation platform 102 may be any type of platform capable of supporting the equipment and housing needed for operation of the solid waste collection system 100. For purposes of illustrating the preferred embodiment of the present invention, the flotation platform 102 is a catamaran-like, twin hull vessel, as best seen in FIG. 4 (described later).

The covering structure 104, which is optional, includes a roof 114, which may be made out of any suitable material adapted for the environment. A lightweight metal roof is capable of performing the necessary sheltering function of the roof 114. The side walls 116 of the covering structure 104 could be cedar board and batten over a wooden frame, appropriately treated, as necessary, for durability and resistance to environmental conditions.

The four pilings 106 (only two shown in FIG. 1) are preferably 16-inch diameter coated steel pilings mounted on the corners of the flotation platform 102. They can be used to tie the solid waste collection system 100 in a stationary position in a flowing waterway. The flotation platform 102 may be tied to pilings sunk in the flowing waterway. Whichever method is used to secure it in place, the flotation platform 102 is intended to rise and fall in place with the changing height of the waterway in which it operates. This is important because some waterways can experience dramatic changes in volumetric flow rate and mean water levels as the result of rainfall or tides.

The water wheel 108 generates power from the flowing current or from an auxiliary back-up pump (described later). The power is transferred to the conveyor 110 by means of, for example, a shaft, gears, sprockets, belts, pulleys and/or chain. The water wheel 108 is used instead of an internal combustion engine or electrical motor because it reduces the need for an external power source, it does not generate waste (e.g., air and noise pollution), and it can be made aesthetically pleasing. It also can rotate at a speed that is proportional to the volumetric flow rate of the waterway in which it operates. Thus, it inherently possesses a rotational velocity controller that would not be found on an internal combustion engine or electrical motor without installing a separate flow rate transducer at greater expense.

The water wheel 108 of the present invention is preferably sized to produce sufficient power to operate the conveyor 110, as well as to generate power for other mechanical and/or electrical equipment needed to operate the solid waste collection system 100. The power output from the water wheel 108 needed to operate just the conveyor 110, taking into consideration the efficiency of the wheel and its axial shaft, is estimated to be between 1 and 20 horsepower, depending upon the required speed of the conveyor 110. The water wheel 108 is made from epoxy-coated steel to resist degradation due to exposure to environmental conditions. Suitable water wheels for the present invention are available from Hydro Techno, Inc. of Franklin, N.C. (d.b.a. Waterwheel Factory).

Figure 2:
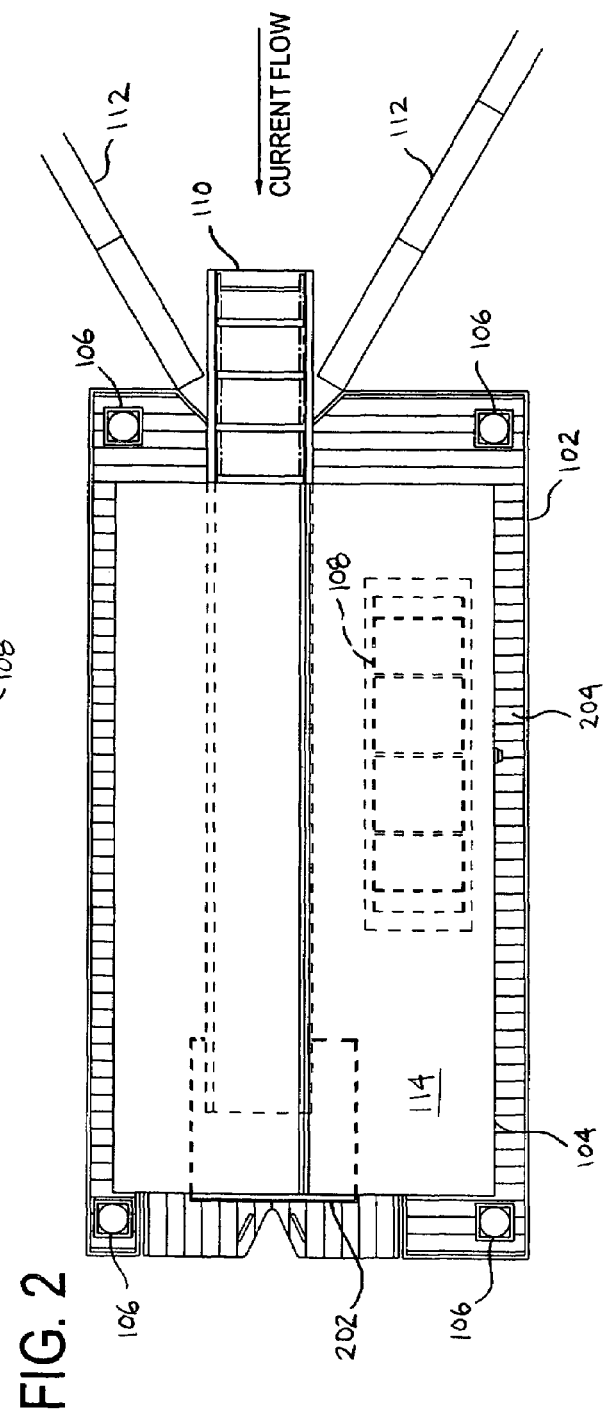
FIG. 2 is a drawing of a top view of the solid waste collection system of FIG. 1.

The conveyor 110 is approximately center-mounted on the solid waste collection system 100 and runs approximately the length of the solid waste collection system 100, as best seen in FIG. 2. In FIG. 1, the bow-mounted collection end of the conveyor 110 is shown partially-submerged just under the design water line of the flowing waterway in which the solid waste collection system 100 is operating. However, the conveyor 110 may be lowered even farther so that the collection end of the conveyor is up to two to three feet below the design water line.

The floating booms 112 may be any conventional booms that are sized to prevent water from flowing over the top of the booms. The floating booms 112 may be tied or tethered on one end to the bow of the solid waste collection system 100. They are positioned in such a way as to extend out to a desired position in the waterway to cover a large surface area. The opposite end of the floating booms 112 should be tied to a stationary object to keep them in place.

Turning to FIG. 2, shown therein is a top view of the solid waste collection system 100, showing the flotation platform 102, the covering structure 104, the pilings 106, the water wheel 108, the conveyor 110, and the floating booms 112. Also shown is a waste storage container 202 positioned at the distal end of the conveyor 110 and under the roof 114, as well as decking boards 204.

The waste storage container 202 is preferably sized to hold about eight cubic feet of collected solid waste, but the size may vary as needed. It may be positioned on the flotation platform 102 or on a separate floating platform (not shown) that may be moved by any conventional means, including attaching a motor to the platform, using ropes to pull the platform, or simply floating the platform downstream to a waste treatment facility.

The decking boards 204 in the embodiment shown cover the standing surface areas of the flotation platform 102. They are preferably 2×6 inch Ipe hardwood, other rot-resistant hardwoods, or synthetic, slip-resistant, dimensional lumber products. They should be fastened to the flotation platform 102 with 3-inch stainless deck screws.

In FIG. 2, the floating booms 112 are shown in a V-configuration for illustration purposes only. The solid waste collection system 100 may be operated with zero, one, two, or even several booms tied together in a manner that increases the efficiency of collecting solid waste in the waterway in which the solid waste collection system 100 is operating. Instead of, or in addition to, the floating booms 112, two sideways mounted conveyors may be positioned near the collection end of the conveyor 110 to help convey solid waste toward the collection end of the conveyor 110.

Figure 3:
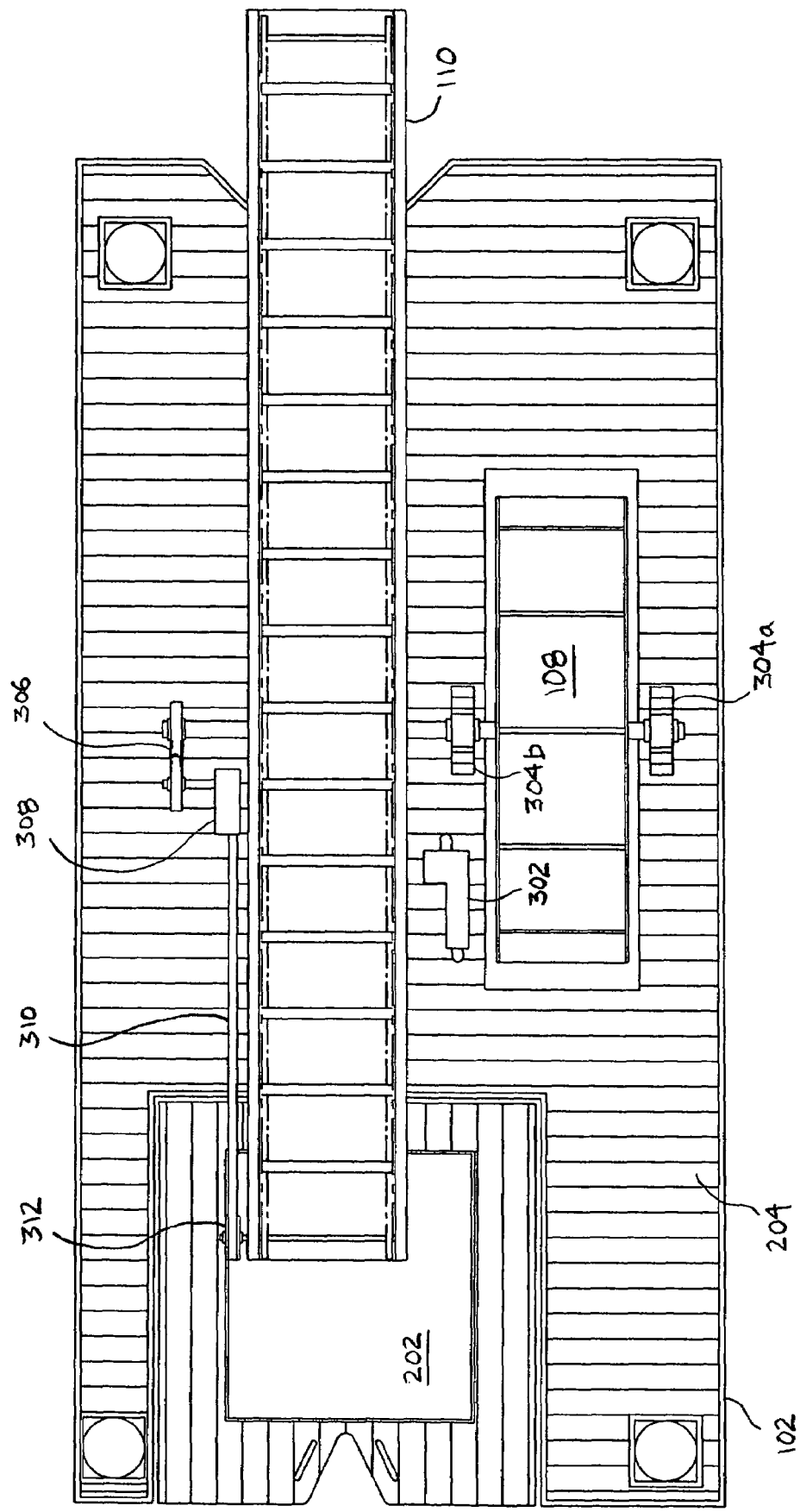
FIG. 3 is another drawing of the top view of the solid waste collection system of FIG. 1 without the shelter roof and sides.

Turning to FIG. 3, shown therein is a top view of the solid waste collection system 100 of FIG. 2, but without the covering structure 104. An auxiliary pump 302 is shown mounted proximate to the water wheel 108. It can be plumbed with 4-inch schedule 40 PVC with a ¾-inch hose outlet. The auxiliary pump 302 is preferably powered by an internal combustion engine and/or by an electric motor (not shown). It is plumbed so that the suction is on the downstream side of the water wheel 108 with the intake toward the water wheel 108. The discharge is on the upstream side of the water wheel 108 directed in such a manner that it powers the water wheel 108 at times when the current is insufficient and the rotational velocity of the water wheel 108 is reduced by 50-percent for more than one hour. The auxiliary pump 302 is fitted with an electrical outlet (not shown) that can be used to power equipment to clean the flotation platform 102 and other surfaces of the device. A series of photovoltaic solar panels (not shown) may be mounted on the solid waste collection system 100 to generate electricity for the system.

As shown in FIG. 3, the water wheel 108 is mounted on a central axle supported by two bearings 304a, 304b. The axle is preferably coupled to a 2:1 reduction or reverse gear 306, with a manually operated clutch 308 attached to a belt drive 310 looped between the clutch 308 and drive roller 312 on the discharge end of the conveyor 110.

FIG. 4 illustrates the bottom view of the flotation platform 102, which in the embodiment shown, consists of a frame 402 and flotation drums 404 having various sizes and shapes. The frame 402 may be made from pressure treated laminated engineered dimensional lumber products, preferably 3×12-inch boards cut to size and fastened together using appropriate hardware. The frame 402 includes opening 406 for the water wheel 108.

The flotation drums 404 are generally high density polyethylene with expanded polystyrene (EPS) foam or the equivalent polymeric material. Suitable float drums are available from Follansbee Dock Systems, Inc. Essentially any structure capable of floating the solid waste collection system 100 could be used.

Figure 5:
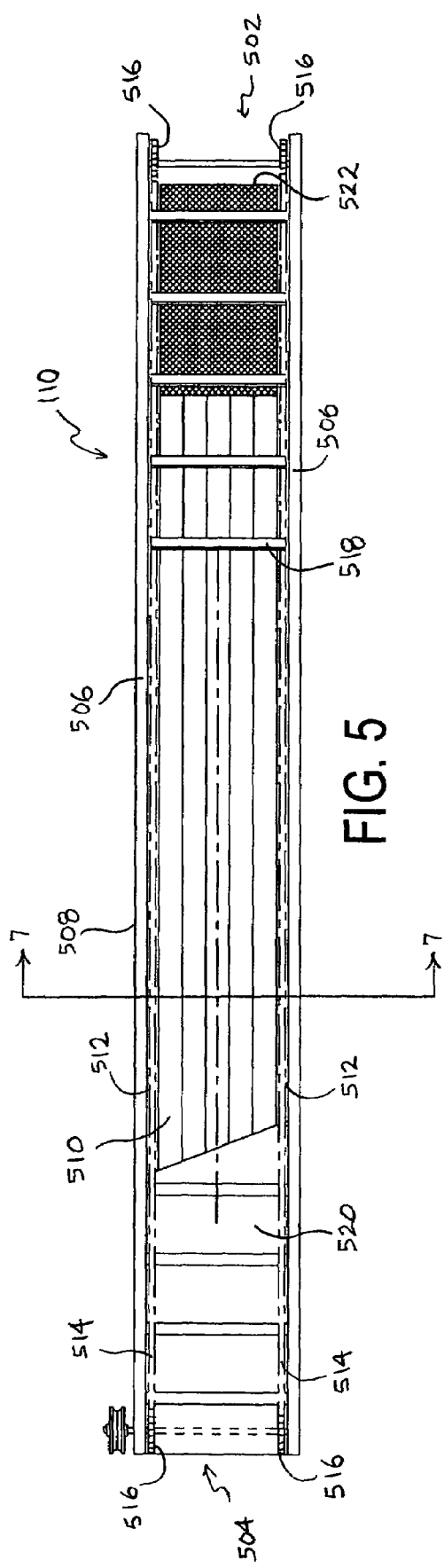
FIG. 5 is a schematic plan view drawing showing one embodiment of the conveyor of the solid waste collection system of FIG. 1.

Turning now to FIG. 5, shown therein is a detailed top view of one embodiment of the conveyor 110, which includes a bow-mounted collection end 502 and stern-mounted discharge end 504. The width of the conveyor 110 shown in the embodiment of FIG. 5 should be sized to accommodate the estimated load of solid waste to be collected by the solid waste collection system 100.

The conveyor 110 could include spaced-apart, epoxy-coated D-channels 506 that are preferably made from 11 gauge corrosion-resistant steel with an 8-inch channel width (2-inch flanges), each of which supports 2×8 inch channel-mounted Ipe hardwood planks 508 running the length of the conveyor 110.

Figure 6:
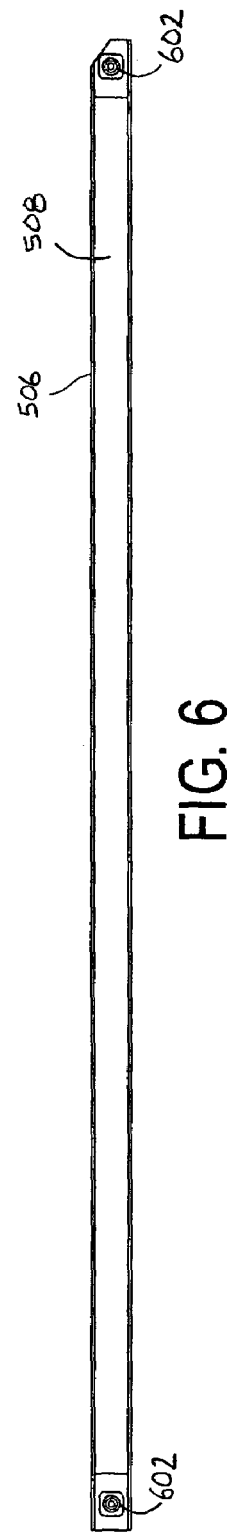
FIG. 6 is a drawing of an elevation view of the conveyor of FIG. 5.

Between the channels 506 is, preferably, an Ipe hardwood bed 510, made from 1¼×6 inch boards (five shown). The outermost boards could include a routed chain groove 512 proximate to their respective outer edges for accommodating the two stainless steel roller chains 514 (ANSI #50; ⅝-inch pitch). The roller chains 514 could be attached to four 24-tooth stainless steel sprockets 516 on both ends of the conveyor 110. The sprockets 516 would be attached to ¾-inch stainless steel shafts mounted in double-sealed bearings 602 as shown in FIG. 6.

Figure 7:
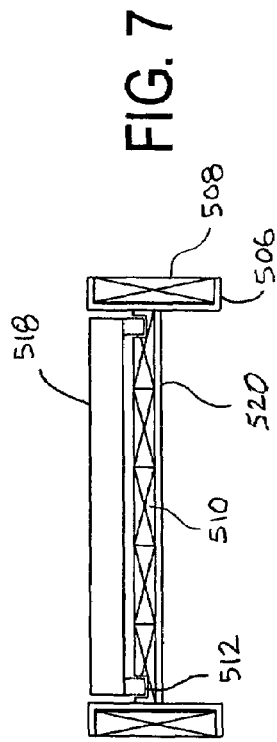
FIG. 7 is a drawing of a cross-section view of the conveyor of FIG. 5.

Supporting the bed 510 is a steel support platform 520 (as seen in FIG. 7), preferably made from 12-inch sheets of ¼×4×2 inch steel, welded together. The front-most portion of the collection end 502 may include a 4×4 foot perforated, stainless steel screen 522.

Mounted on and between the two roller chains 514 are L-shaped ladder members 518 (as also seen in FIG. 7). Each ladder member 518 is designed to traverse the length of the conveyor 110 substantially flush with the surface of the bed 510. The spacing between the bottom of the ladder members 518 and the top of the bed 510 should be small enough to prevent small beads of polystyrene and cigarette butts from slipping back into the water.

The solid waste collection system 100 described above is fixedly mounted in a flowing waterway, but is adapted to being moved to various locations, such as where stormwater, potentially contaminated with solid waste, outfalls into a river. Once a suitable location has been selected for the solid waste collection system 100, it is positioned in the flow of the waterway to maximize the potential energy available to the water wheel 108 and to maximize the efficiency of collecting solid waste in the waterway. The system 100 may then be moored in place by fixed pilings, cables, chains, or other devices. The floating booms 112 are then arranged in a suitable manner to efficiently capture and direct as much floating solid waste as possible toward the collection end 502 of the conveyor 110. The collection end 502 of the conveyor 110 is then lowered into the water to a suitable depth.

When the water wheel 108 begins to rotate, the conveyor 110 begins to move and the ladder members 518 rotate from the bottom of the conveyor 110 up through the mass of solid waste being screened by the screen 522. The L-shaped ladder members 518 push the collected solid waste up the bed 510 of the conveyor 110 to the discharge end 504. As the ladder members 518 rotate to the bottom of the conveyor 110, the solid waste that is stacked against the ladder members 518 falls by gravity into the waste storage container 202. That process continues as long as the flowrate of the waterway is sufficient to turn the water wheel 108 (if the flowrate is insufficient, the auxiliary pump 302 turns on to provide additional flowrate for the water wheel 108). As needed, the waste storage container 202 will need to be emptied (alternatively, the discharge end 504 of the conveyor 110 can be positioned such that the solid waste collected by the solid waste collection system 100 is discharged to a dumpster or separate barge using a series of interconnecting conveyors (not shown).

It is also possible for the solid waste collection system 100 to be equipped with optional watercraft motors to provide a means to propel the solid waste collection system 100 under its own power in order to operate in static waters.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A system for collecting waste in a body of flowing water comprising:

a substantially stationary flotation platform adapted for floating in the flowing water;

a waste collection conveyor mounted on the platform having collection and discharge ends;

collection means for separating the waste from the flowing water and conveying the waste along the conveyor to the discharge end;

storage means for storing the conveyed waste;

a water wheel interconnected with the conveyor, wherein the water wheel transfers energy from the flowing water to the conveyor to cause the conveyor to convey the waste;

and a pump for pumping water toward the water wheel.

2. The waste collection system of claim 1, further comprising positioning means for securely positioning the platform in the flowing water.

3. The waste collection system of claim 1, further comprising a screen at the collection end for screening the waste from the flowing water.

4. The waste collection system of claim 1, further comprising at least one boom attached to and extending outward from the upstream end of the platform.

5. The waste collection system of claim 1, wherein the water wheel is adapted to rotate when it is at least partially submerged in and substantially aligned with the direction of the current of the flowing water.

6. The waste collection system of claim 1, wherein the plane of the water wheel and the longitudinal axis of the conveyor are substantially parallel with each other.

7. The waste collection system of claim 1, wherein the collection means comprises a plurality of spaced apart ladder members attached to a rotating belt chain interconnected with the water wheel.

8. The waste collection system of claim 1, wherein the conveyor is inclined such that the collection end is submerged under the surface of the flowing water and the discharge end is proximate a top of the storage means.

9. The waste collection system of claim 1, wherein the storage means is a transportable container.

10. A system for collecting waste in a body of flowing water comprising:
- a substantially stationary flotation platform adapted for floating in the flowing water;
- a waste collection conveyor mounted on the platform having a collection end inclined downward below the surface of the flowing water and a discharge end;
- ladder means for separating the waste from the flowing water and conveying the solid waste along the conveyor to the discharge end;
- storage means proximate to the discharge end for storing the conveyed waste;
- a water wheel interconnected with the ladder means, wherein the water wheel transfers energy from the flowing water to the ladder means to cause the ladder means to convey the waste;
- and a pump for automatically pumping water toward the water wheel when the rotational velocity of the water wheel is reduced.

11. The waste collection system of claim 10, wherein the platform is adapted to being securely positioning in the flowing water.

12. The waste collection system of claim 10, further comprising a screen at the collection end for screening the waste from the flowing water.

13. The waste collection system of claim 10, further comprising at least one boom attached to and extending outward from the upstream end of the platform.

14. The waste collection system of claim 10, wherein the water wheel is adapted to rotate when it is at least partially submerged in and substantially aligned with the direction of the current of the flowing water.

15. The waste collection system of claim 10, wherein the ladder means comprises a plurality of spaced apart ladder members attached to a rotating belt chain interconnected with the water wheel.

16. The waste collection system of claim 10, wherein the storage means is a transportable container.

17. A method for collecting waste in a body of flowing water comprising:
a) identifying a body of flowing water containing waste;
b) installing a substantially stationary flotation platform adapted for floating in the flowing water, wherein the platform comprises:
- a waste collection conveyor mounted on the platform having a collection end inclined downward below the surface of the flowing water and a discharge end;
- ladder means for separating the waste from the flowing water and conveying the waste along the conveyor to the discharge end;
- storage means proximate to the discharge end for storing the conveyed waste; and
- a water wheel interconnected with the ladder means, wherein the water wheel transfers energy from the flowing water to the ladder means to cause the ladder means to convey the waste;
c) collecting the waste in the storage means using the conveyor and ladder means;
d) pumping water toward the water wheel when the rotational velocity of the water wheel is reduced.

18. The method of claim 17, further comprising the step of securing the platform in a position in the flowing water.

19. The method of claim 17, further comprising the step of screening the waste from the flowing water.

20. The method of claim 17, further comprising the step of installing at least one boom attached to and extending outward from the upstream end of the platform for conveying at least some of the waste.

21. The method of claim 17, further comprising the step of transporting the storage means to dispose of the waste.

* * * * *